United States Patent
Xu et al.

(10) Patent No.: US 11,558,781 B2
(45) Date of Patent: *Jan. 17, 2023

(54) COMMUNICATION DEVICE, COMMUNICATION SYSTEM, COMMUNICATION METHOD, AND NON-TRANSITORY COMPUTER-READABLE MEDIUM

(71) Applicant: NEC Corporation, Tokyo (JP)

(72) Inventors: Ling Xu, Tokyo (JP); Takanori Iwai, Tokyo (JP); Nobuhiko Itoh, Tokyo (JP)

(73) Assignee: NEC CORPORATION, Tokyo (JP)

(*) Notice: Subject to any disclaimer, the term of this patent is extended or adjusted under 35 U.S.C. 154(b) by 37 days.

This patent is subject to a terminal disclaimer.

(21) Appl. No.: 17/198,617

(22) Filed: Mar. 11, 2021

(65) Prior Publication Data

US 2021/0204173 A1    Jul. 1, 2021

Related U.S. Application Data

(63) Continuation of application No. 16/345,956, filed as application No. PCT/JP2016/004776 on Oct. 31, 2016, now Pat. No. 10,966,120.

(51) Int. Cl.
*H04W 28/12*      (2009.01)
*H04W 28/02*      (2009.01)
(Continued)

(52) U.S. Cl.
CPC ....... *H04W 28/12* (2013.01); *H04W 28/0236* (2013.01); *H04W 28/0278* (2013.01); *H04W 28/06* (2013.01); *H04W 48/06* (2013.01)

(58) Field of Classification Search
CPC ......... H04W 28/0236; H04W 28/0278; H04W 28/06; H04W 28/10; H04W 28/12; H04W 48/06

See application file for complete search history.

(56) References Cited

U.S. PATENT DOCUMENTS

| 6,728,270 | B1 | 4/2004 | Meggers |
| 10,966,120 | B2* | 3/2021 | Xu ........................ H04W 48/06 |
| 2018/0242191 | A1 | 8/2018 | Lundqvist |

FOREIGN PATENT DOCUMENTS

| JP | 2001-274804 A | 10/2001 |
| JP | 2007-312413 A | 11/2007 |

(Continued)

OTHER PUBLICATIONS

International Search Report for PCT/JP2016/004776 dated Jan. 17, 2017 [PCT/ISA/210].

(Continued)

*Primary Examiner* — Derrick V Rose
(74) *Attorney, Agent, or Firm* — Sughrue Mion, PLLC

(57) ABSTRACT

There is provided a communication device capable of determining whether admission of new data traffic is allowed or rejected not by comparing throughputs only, but by considering other parameters when the data traffic is admitted. A communication device (10) according to the present invention includes a determination unit (11) that determines whether to admit a flow regarding a new radio terminal (30), the flow being to be transmitted between a radio terminal (30) and a base station (20) and having a transmission deadline, depending on a transmission state of a plurality of data packets included in the flow, and a communication unit (12) that transmits, to the base station (20), instruction information indicating whether to admit the flow regarding the new radio terminal (30).

5 Claims, 17 Drawing Sheets

(51) Int. Cl.
   *H04W 28/06* (2009.01)
   *H04W 48/06* (2009.01)

(56) References Cited

FOREIGN PATENT DOCUMENTS

| | | | |
|---|---|---|---|
| JP | 2009-521897 A | 6/2009 |
| JP | 2009-278532 A | 11/2009 |
| JP | 2011-30126 A | 2/2011 |
| JP | 2013-229884 A | 11/2013 |

OTHER PUBLICATIONS

Communication dated Jul. 7, 2020 from Japanese Patent Office in JP Application No. 2018-546939.

* cited by examiner

| Parameter | Description | Examples |
|---|---|---|
| eNB ID | The ID of eNB to which this message is sent | GlobaleNB ID |
| SCEF ID | The ID of SCEF from which this message is sent | Global SCEF ID |
| Direction | Is this WCQ information for UL or DL | Class Indicator (UP link, Downlink, Both) |
| Notification Interval | | |

Fig. 7

| Parameter | Description | Examples |
|---|---|---|
| SCEF ID | The ID of SCEF to which this message is sent | GlobalSCEF ID |
| eNB ID | The ID of eNB from which this message is sent | Global eNB ID |
| Direction | Is this WCQ information for UL or DL | Class Indicator (UP link, Downlink, Both) |
| WcqValue | The WCQ of each UE on each RB | |

Fig. 8

| UEID \ RBIndex | 1 | ... | 100 |
|---|---|---|---|
| 000001 | | | |
| .... | | | |
| FFFFFF | | | |

| Parameter | Description | Examples |
|---|---|---|
| eNB ID | The ID of eNB to which this message is sent | GlobaleNB ID |
| SCEF ID | The ID of SCEF from which this message is sent | Global SCEF ID |
| Notification Interval | | |

Fig. 11

| Parameter | Description | Examples |
|---|---|---|
| SCEF ID | The ID of SCEF to which this message is sent | GlobalSCEF ID |
| eNB ID | The ID of eNB from which this message is sent | Global eNB ID |
| Scheduler Type | The ID of the sheduler run on the eNB | PF/RR/MT |

Fig. 12

| Parameter | Description | Examples |
|---|---|---|
| eNB ID | The ID of eNB to which this message is sent | GlobaleNB ID |
| SCEF ID | The ID of SCEF from which this message is sent | Global SCEF ID |
| Notification Interval | | |

Fig. 14

| Parameter | Description | Examples |
|---|---|---|
| SCEF ID | The ID of SCEF to which this message is sent | GlobalSCEF ID |
| eNB ID | The ID of eNB from which this message is sent | Global eNB ID |
| Remain BufferSize | The latest buffer sizes of each UE | |
| Direction | Is this WCQ information for UL or DL | Class Indicator (UP link, Downlink, Both) |

Fig. 15

| UEID | ulBufferSize | dlBufferSize |
|---|---|---|
| 000001 | 5bytes | 30bytes |
| .... | .... | .... |
| FFFFFF | 15bytes | 20bytes |

Fig. 16

COMMUNICATION DEVICE, COMMUNICATION SYSTEM, COMMUNICATION METHOD, AND NON-TRANSITORY COMPUTER-READABLE MEDIUM

The present application is a Continuation application of Ser. No. 16/345,956 filed on Apr. 29, 2019, which is a National Stage Entry of PCT/JP2016/004776 filed on Oct. 31, 2016, the contents of all of which are incorporated herein by reference, in their entirety.

TECHNICAL FIELD

The present invention relates to a communication device, a communication system, a communication method, and a program, and particularly relates to a communication device, a communication system, a communication method, and a program that perform admission control of a flow.

BACKGROUND ART

Currently, it has been considering providing low latency services via mobile networks. Low latency services may be, for example, automatic driving services for transmitting on-vehicle sensor information, traffic-camera information, and map information via mobile networks.

Mobile carriers (mobile network operators) are required to secure Service Level Agreement (SLA) in order to provide users with low latency services. In the SLA, for example, a delay time secured in the low latency services and the like may be defined.

For example, Patent Literature 1 discloses processing regarding admission control performed to maintain the quality of a network. For example, Patent Literature 1 discloses an admission controller AC that calculates a currently used throughput. The admission controller further calculates the difference between the maximum available throughput and the currently used throughput to determine the currently available throughput. The admission controller rejects admission of real-time data traffic when the desired throughput in the real-time data traffic exceeds the currently available throughput. The admission controller sets a transmission deadline in the real-time data traffic the admission of which is allowed.

CITATION LIST

Patent Literature

Patent Literature 1: Japanese Unexamined Patent Application Publication No. 2007-312413

SUMMARY OF INVENTION

Technical Problem

In the admission control disclosed in Patent Literature 1, admission of data traffic is determined to be allowed or rejected by comparing throughputs when the data traffic is admitted. However, a different SLA can be set in each real-time data traffic, and the desired quality is different. Thus, if admission is determined to be allowed or rejected by comparing throughputs only, it is difficult to precisely determine whether the SLA regarding each real-time data traffic is satisfied.

A purpose of the present invention is to provide a communication device, a communication system, a communication method, and a program capable of determining whether admission of new data traffic is allowed or rejected not by comparing throughputs only, but by considering other parameters when the data traffic is admitted.

Solution to Problem

A communication device according to a first aspect of the present invention includes a determination unit that determines whether to admit a flow regarding a new radio terminal, the flow being to be transmitted between a radio terminal and a base station and having a transmission deadline, depending on a transmission state of a plurality of data packets included in the flow, and a communication unit that transmits, to the base station, instruction information indicating whether to admit the flow regarding the new radio terminal.

A communication system according to a second aspect of the present invention includes a communication device that determines whether to admit a flow regarding a new radio terminal, the flow being to be transmitted between a radio terminal and a base station and having a transmission deadline, depending on a transmission state of a plurality of data packets included in the flow and transmits instruction information indicating whether to admit the flow regarding the new radio terminal, and a base station that receives the instruction information and performs processing for admitting or rejecting the flow regarding the new radio terminal in accordance with the instruction information.

A communication method according to a third aspect of the present invention includes determining whether to admit a flow regarding a new radio terminal, the flow being to be transmitted between a radio terminal and a base station and having a transmission deadline, depending on a transmission state of a plurality of data packets included in the flow, and transmitting, to the base station, instruction information indicating whether to admit the flow regarding the new radio terminal.

A program according to a fourth aspect of the present invention causes a computer to execute determining whether to admit a flow regarding a new radio terminal, the flow being to be transmitted between a radio terminal and a base station and having a transmission deadline, depending on a transmission state of a plurality of data packets included in the flow, and transmitting, to the base station, instruction information indicating whether to admit the flow regarding the new radio terminal.

Advantageous Effects of Invention

According to the present invention, it is possible to provide a communication device, a communication system, a communication method, and a program capable of determining whether admission of new data traffic is allowed or rejected not by comparing throughputs only, but by considering other parameters when the data traffic is admitted.

BRIEF DESCRIPTION OF DRAWINGS

FIG. 7 is a diagram showing parameters set in a WcqNotificationSetup message according to the second embodiment.

FIG. 8 is a diagram showing parameters set in a WcqNotification message according to the second embodiment.

FIG. 11 is a diagram showing parameters set in a SchedulingPolicyRequest message according to the second embodiment.

FIG. 12 is a diagram showing parameters set in a SchedulingPolicyResponse message according to the second embodiment.

FIG. 14 is a diagram showing parameters set in a RemainBufferSizeSetup message according to the second embodiment.

FIG. 15 is a diagram showing parameters set in a RemainBufferSizeNotification message according to the second embodiment.

FIG. 16 is a diagram showing RemainBufferSizes set in the RemainBufferSizeNotification message according to the second embodiment.

DESCRIPTION OF EMBODIMENTS

First Embodiment

Figure 1:
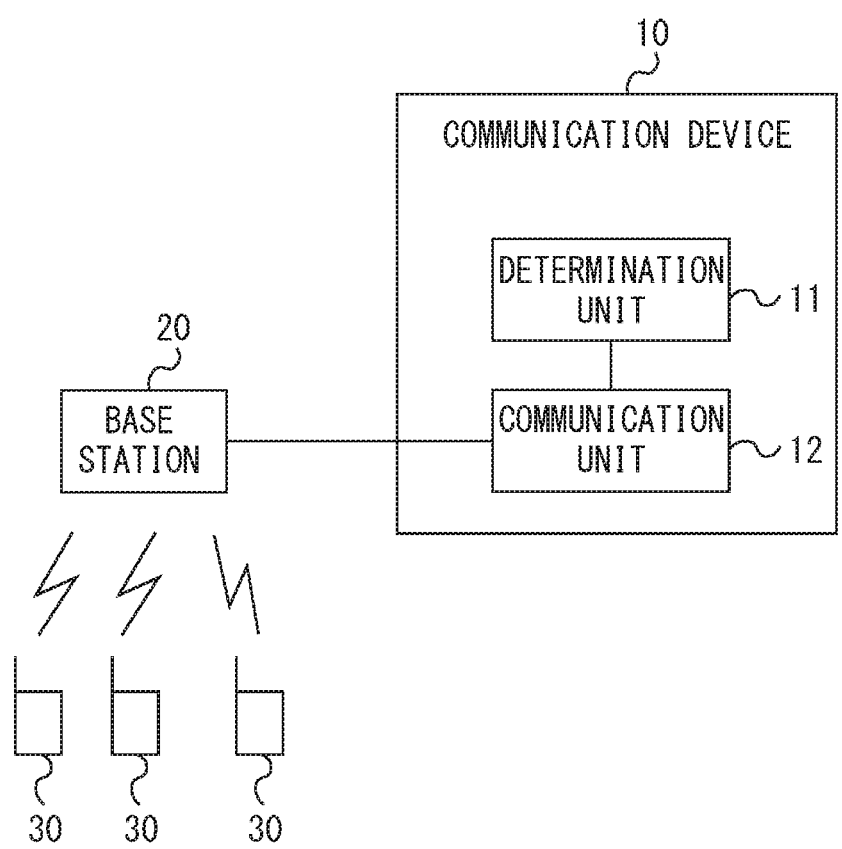
FIG. 1 is a configuration diagram of a communication system according to a first embodiment.

Hereinafter, embodiments of the present invention are described with reference to the drawings. With reference to FIG. 1, a configuration example of a communication system according to a first embodiment of the present invention is described. The communication system in FIG. 1 includes a communication device 10, a base station 20, and a plurality of radio terminals 30. The communication device 10, the base station 20, and the radio terminals 30 may each be a computer device operated by a processor executing programs stored in a memory.

The radio terminals 30 may be mobile phone terminals, smartphone terminals, tablet terminals, and the like. Alternatively, the radio terminals 30 may be Internet of Things (IoT) terminals, Machine to Machine (M2M) terminals, Machine Type Communication (MTC) terminal, and the like which are used for IoT services. The radio terminals 30 perform radio communication with the base station 20.

The base station 20 may be an evolved Node B (eNB) or a Node B defined in the 3rd Generation Partnership Project (3GPP). An eNB is a base station using Long Term Evolution (LTE) as a radio communication system. A Node B is a base station using a radio communication system referred to as 3G in the 3GPP as a radio communication system. In addition, a radio communication system used by the base station 20 is not necessarily defined in the 3GPP, and may be radio communication systems defined by other standardizing organizations may be used. The base station 20 may be referred to as a radio access network node or the like.

The communication device 10 controls the base station 20. The communication device 10 may control, for example, scheduling performed in the base station 20. The scheduling performed in the base station 20 may be referred to as Medium Access Control (MAC) scheduling, packet scheduling, or the like.

The communication device 10 may be, for example, a Service Capability Exposure Function (SCEF) entity defined in the 3GPP (hereinafter, referred to as SCEF). The SCEF performs, for example, authentication processing or the like regarding an application server managed by a mobile network operator, an application service provider, or the like. The SCEF further communicates with the base station 20, which is an eNB, via a reference point defined in the 3GPP. The SCEF transmits, for example, control data in a core network. The control data is used to, for example, set a communication path for transmitting user data regarding a radio terminal 30. The SCEF may be referred to as, for example, a C-Plane Function (CPF) entity that is a node device for transmitting control data.

Alternatively, the communication device 10 may be a Mobile Edge Computing (MEC) server. The MEC server may be arranged at a position where the MEC server can directly communicate with the base station 20. The position where the MEC server can directly communicate means a position where the MEC server can communicate without a core network managed by a mobile network operator. For example, the MEC server may be physically integrated with the base station 20. Alternatively, the MEC server may be arranged in the same building as the base station 20 and connected to a Local Area Network (LAN) in the building so as to communicate with the base station 20. By arranging the MEC server in the periphery of the base station 20, it is possible to shorten the transmission delay between the MEC server and the radio terminal 30. The MEC server is used to, for example, provide a low-latency application service.

In addition, the communication device 10 may be arranged in an IoT platform including servers providing the radio terminals 30 with an IoT service. Alternatively, the communication device 10 may be a server device capable of communicating with the base station 20 directly or via a network. The communication device 10 may have both Control Plane and User Plane functions in either case of a device described above or another device.

Next, a configuration example of the communication device 10 is described. The communication device 10 includes a determination unit 11 and a communication unit 12. The determination unit 11 and the communication unit 12 may each be software or a module the processing of which is performed by a processor executing programs stored in a memory. Alternatively, the determination unit 11 and the communication unit 12 may each be hardware such as a chip or a circuit.

The determination unit 11 determines whether to admit a flow regarding a new radio terminal 30 depending on the transmission state of a plurality of data packets included in the flow. The flow is to be transmitted between a radio terminal 30 and the base station 20 and has a deadline.

The flow to be transmitted between the radio terminal 30 and the base station 20 includes, for example, one or more data packets to be transmitted in an application service provided to the radio terminal 30. The one or more data packets may be referred to as data.

The flow to be transmitted between the radio terminal 30 and the base station 20 may be a flow to be transmitted from the radio terminal 30 to the base station 20 or a flow to be transmitted from the base station 20 to the radio terminal 30. Alternatively, the flow to be transmitted between the radio terminal 30 and the base station 20 may include a flow to be transmitted from the radio terminal 30 to the base station 20 and a flow to be transmitted from the base station 20 to the radio terminal 30. The data included in the flow to be transmitted from the radio terminal 30 to the base station 20 is referred to as Uplink (UL) data. The data included in the flow to be transmitted from the base station 20 to the radio terminal 30 is referred to as Downlink (DL) data. Data to be transmitted in the application service may be, for example, image data, moving image data, or the like. Application data may contain a request message for requesting transmission of image data or the like, a response message for responding to the request message, and the like.

The transmission deadline means a time limit by which transmission of a plurality of data packets included in one flow is to be completed. The transmission deadline is requested by an application. The transmission deadline can be referred to as a transmission time limit. Alternatively, the transmission deadline can be referred to as maximum transmission delay allowed by the application. The transmission deadline can be variously defined. For example, the transmission deadline may be a time limit by which a sender of an application layer completes transmission. Alternatively, the transmission deadline may be a time limit by which a sender of a radio layer completes transmission. Alternatively, the transmission deadline may be a time limit by which a receiver of an application layer completes reception. Alternatively, the transmission deadline may be a time limit by which a receiver of a radio layer completes reception. Alternatively, to be more specific, the transmission deadline may be a time limit until which a sender of an application layer starts transmitting the first data packet included in a flow and a receiver of the application layer completes receiving the last data packet included in the flow. Alternatively, the transmission deadline may be a time limit until which a sender of a radio layer starts transmitting the first data packet included in a flow and a receiver of the radio layer completes receiving the last data packet included in the flow. Information about the transmission deadline may be received by the MEC server from the application server. The MEC server may determine a service applied to the data received at the user plane of the MEC server and determine the transmission deadline based on the service. Alternatively, the MEC server may receive, from the application server, information about a service applied to the data and determine the transmission deadline based on the service.

The transmission state may be, for example, the amount of untransmitted data packets in a plurality of data packets included in a flow, the buffer size, or information indicating whether all the data packets included in a flow can be transmitted by the transmission deadline, or the like.

The communication unit 12 transmits, to the base station 20, instruction information indicating whether to admit a flow regarding a new radio terminal. The base station 20 performs processing for admitting the flow regarding the new radio terminal in accordance with the determination result determined by the determination unit 11 of the communication device 10. In other words, the base station 20 performs scheduling regarding the new radio terminal 30 in accordance with the determination result transmitted from the communication device 10.

As described above, the communication device 10 in FIG. 1 is capable of determining whether to admit a flow regarding a new radio terminal depending on the transmission state of the data packets in which the time until the transmission deadline is considered. In other words, the base station 20 is capable of determining whether to admit a flow regarding a new radio terminal depending on the service quality, which means that the transmission deadline of the existing flow is satisfied, and it is possible to maintain or improve the service quality of the base station 20.

Second Embodiment

Figure 2:
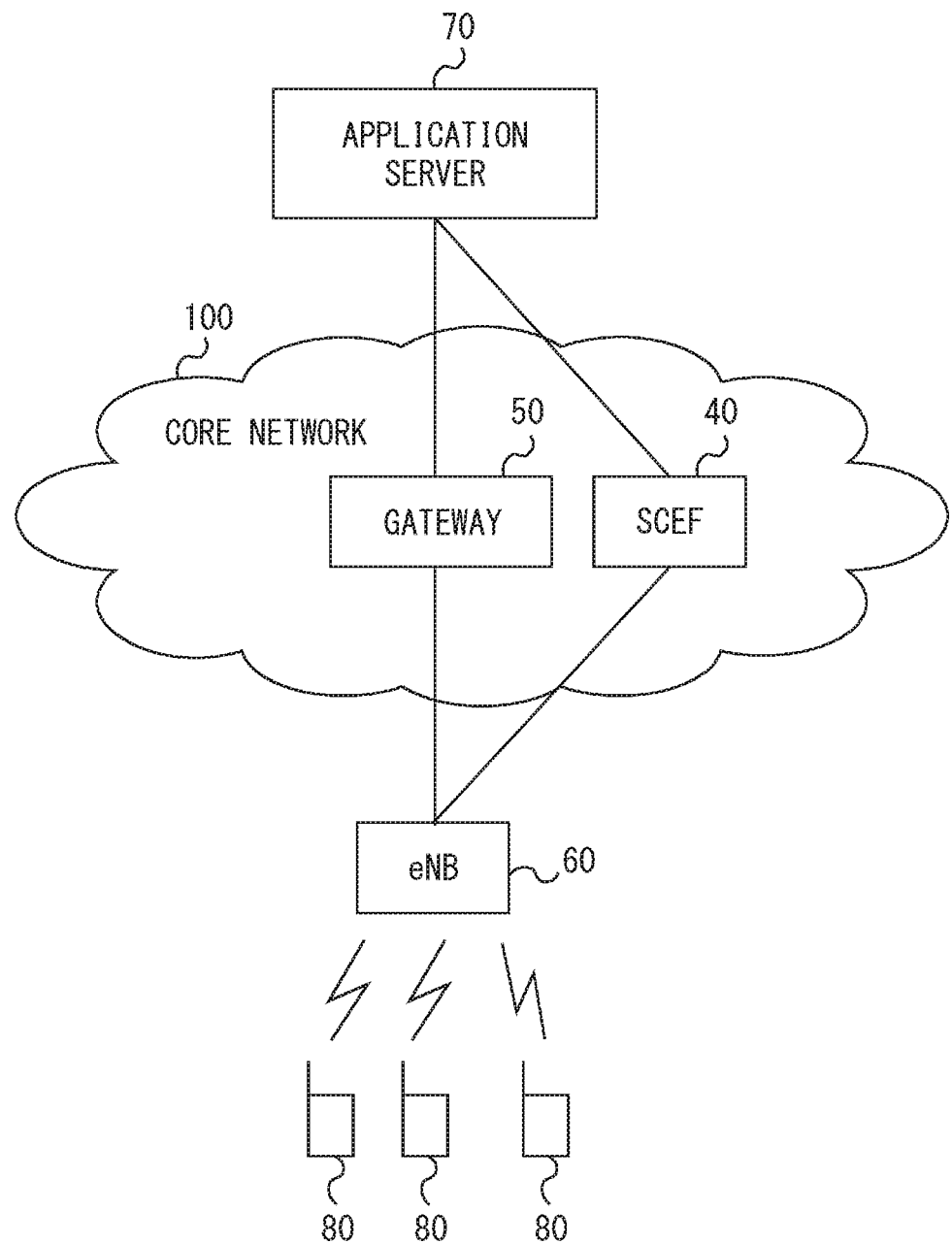
FIG. 2 is a configuration diagram of a communication system according to a second embodiment.

Next, a configuration example of a communication system according to a second embodiment of the present invention is described with reference to FIG. 2. The communication system in FIG. 2 is a communication system defined in the 3GPP. The communication system in FIG. 2 includes an eNB 60, an application server 70, a core network 100, and a plurality of UEs 80. The UE 80 is a general term of communication terminals used in the 3GPP. The core network 100 is a network managed by a mobile network operator. The core network 100 includes an MEC server 40 and a gateway 50.

The gateway 50 may be, for example, a Serving Gateway (SGW) or a Packet Data Network Gateway (PGW) that transmits user data regarding a UE 80 in the core network 100. Alternatively, the gateway 50 may be a U-Plane Function (UPF) entity that is a node device for transmitting user data regarding a UE 80. The user data may be, for example, image data, moving image data, or the like.

The MEC server 40 transmits, for example, control data in the core network 100. The control data is used to, for example, set a communication path for transmitting user data regarding a UE 80. The MEC server 40 may be referred to as, for example, a C-Plane Function (CPF) entity that is a node device for transmitting control data.

The application server 70 provides the UEs 80 with an application service. The application server 70 transmits, for example, user data to the gateway 50. The application server 70 further transmits, to the MEC server 40, information about the data size (flow size) of the user data to be transmitted in one flow, a transmission deadline in one flow, and the like.

The gateway 50 transmits, to the eNB 60, the user data transmitted from the application server 70. The gateway 50 further transmits, to the application server 70, the user data transmitted from the eNB 60.

The MEC server 40 determines whether to admit a flow regarding a new radio terminal at the eNB 60 using the information transmitted from the application server 70 and the transmission state of the data packets transmitted from the eNB 60. The MEC server 40 transmits the determination result regarding the admission of the flow to the eNB 60.

The eNB 60 performs processing for admitting or rejecting the flow requested by the UE 80 using the determination result regarding the admission of the flow transmitted from the MEC server 40.

Figure 3:
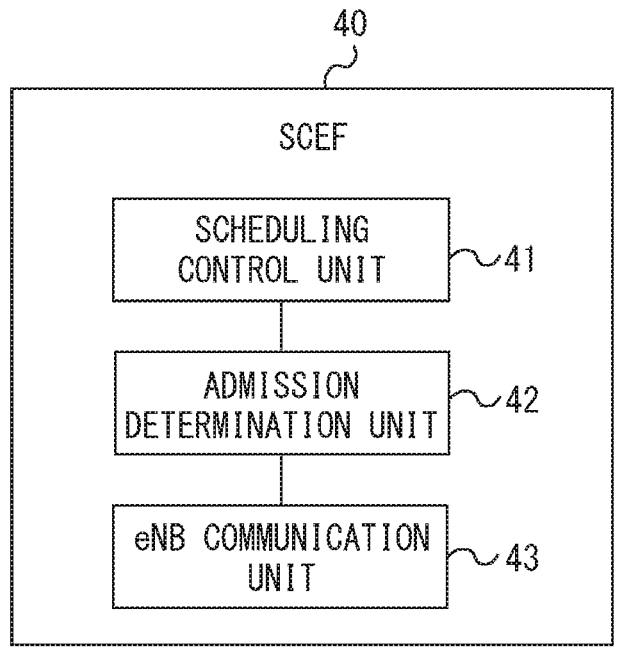
FIG. 3 is a configuration diagram of an MEC server according to the second embodiment.

Next, a configuration example of the MEC server 40 according to the second embodiment is described with reference to FIG. 3. The MEC server 40 includes a scheduling control unit 41, an admission determination unit 42, and an eNB communication unit 43. The scheduling control unit 41, the admission determination unit 42, and the eNB communication unit 43 may each be software or a module the processing of which is performed by a processor executing programs stored in a memory. Alternatively, the scheduling control unit 41, the admission determination unit 42, and the eNB communication unit 43 may each be hardware such as a chip or a circuit.

The scheduling control unit 41 emulates MAC scheduling to be performed in the eNB 60 to determine whether each flow to be processed by the eNB 60 is completed by the transmission deadline. The completion of each flow by the transmission deadline means that all the data packets included in each flow are transmitted by the transmission deadline. The scheduling control unit 41 emulates the MAC scheduling using, for example, the communication quality of the radio resource measured by the UE 80 or the eNB 60. The processing of the scheduling control unit 41 for emulating the MAC scheduling is to be described in detail later. The scheduling control unit 41 outputs, to the admission determination unit 42, the determination result indicating that each flow to be processed by the eNB 60 is completed by the transmission deadline.

The scheduling control unit 41 further estimates the communication quality of the future radio resource using the communication quality of the radio resource measured by the UE 80 or the eNB 60. The communication quality may be, for example, a Channel Quality Indicator (CQI) or information indicating other qualities.

The scheduling control unit 41 estimates the communication quality of the future radio resource using, for example, the tendency of the communication quality of the radio resource acquired in the past or statistical information. For example, the scheduling control unit 41 may estimate that the communication quality of the future radio resource increases when the tendency of the communication quality of the radio resource acquired in the past increases. On the other hand, the scheduling control unit 41 may estimate that the communication quality of the future radio resource decreases when the tendency of the communication quality of the radio resource acquired in the past decreases.

The admission determination unit 42 determines, using the determination result output from the scheduling control unit 41, whether to admit the flow regarding the new UE 80 at the eNB 60. For example, when there is one flow that is not completed by the transmission deadline among a plurality of flows to be processed by the eNB 60, the admission determination unit 42 may reject the admission of the flow regarding the new UE 80. In other words, when all the flows to be processed by the eNB 60 are completed by the transmission deadline, the admission determination unit 42 may allow the admission of the flow regarding the UE 80. Alternatively, when the number of flows that are not completed by the transmission deadline among a plurality of flows to be processed by the eNB 60 exceeds a predetermined threshold, the admission determination unit 42 may reject the admission of the flow regarding the new UE 80. In addition, the admission determination unit 42 may predetermine the number or the rate of the UEs 80 the flows regarding which are rejected to determine whether to admit the flow regarding the new UE 80.

The eNB communication unit 43 transmits, to the eNB 60, instruction information indicating whether to admit the flow regarding the new UE 80.

Figure 4:
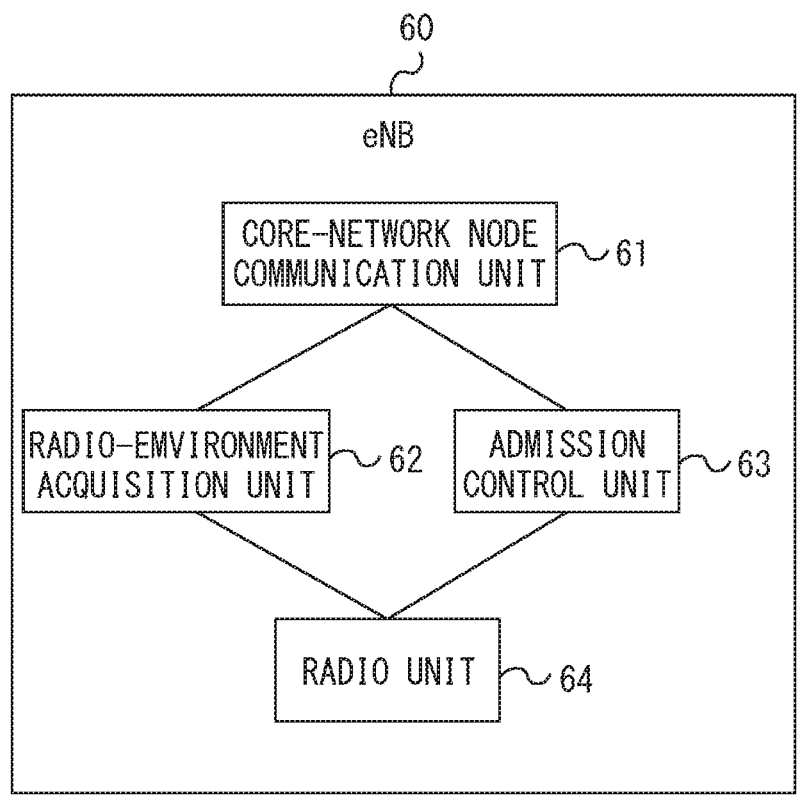
FIG. 4 is a configuration diagram of an eNB according to the second embodiment.

Next, a configuration example of the eNB 60 according to the second embodiment is described with reference to FIG. 4. The eNB 60 includes a core-network node communication unit 61, a radio-environment acquisition unit 62, an admission control unit 63, and a radio unit 64. The core-network node communication unit 61, the radio-environment acquisition unit 62, the admission control unit 63, and the radio unit 64 may each be software or a module the processing of which is performed by a processor executing programs stored in a memory. Alternatively, the core-network node communication unit 61, the radio-environment acquisition unit 62, the admission control unit 63, and the radio unit 64 may each be hardware such as a chip or a circuit.

The radio-environment acquisition unit 62 measures, using the UL data received from the UE 80 via the radio unit 64, the communication quality of the radio resource for transmitting the UL data. The radio-environment acquisition unit 62 further receives, from the UE 80, the communication quality of the radio resource for transmitting the DL data measured by the UE 80 using the DL data. The radio-environment acquisition unit 62 receives information about the communication quality of the radio resource for transmitting the DL data from the UE 80 via the radio unit 64.

The radio-environment acquisition unit 62 transmits, to the MEC server 40 via the core-network node communication unit 61, the communication quality of the radio resource for transmitting the UL and DL data.

The admission control unit 63 receives the instruction information indicating whether to admit the flow regarding the new UE 80 transmitted from the MEC server 40 via the core-network node communication unit 61. The admission control unit 63 performs, using the received instruction information, processing for admitting or rejecting the flow regarding the new UE 80. The processing for rejecting the flow regarding the UE 80 may include, for example, admission processing in which the admission of the flow regarding the UE 80 is temporarily rejected and the flow regarding the UE 80 is admitted after a predetermined time passes. Alternatively, the processing for rejecting the flow regarding the UE 80 may include no allocation of the radio resource to the UE 80 for a predetermined time after the flow regarding the UE 80 is admitted. Here, the UE 80 the flow regarding which is rejected may discard the data packets included in the rejected flow. The UE 80 may discard the data packets included in the rejected flow using a discard timer.

The radio unit 64 performs radio communication with the UE 80 using the radio resource allocated to the UE 80 as a result of the MAC scheduling. In order to perform the MAC scheduling, a system or scheduler type, such as Proportional Fairness (PF), Round Robin (RR), or Maximum Throughput (MT), may be used.

Figure 5:
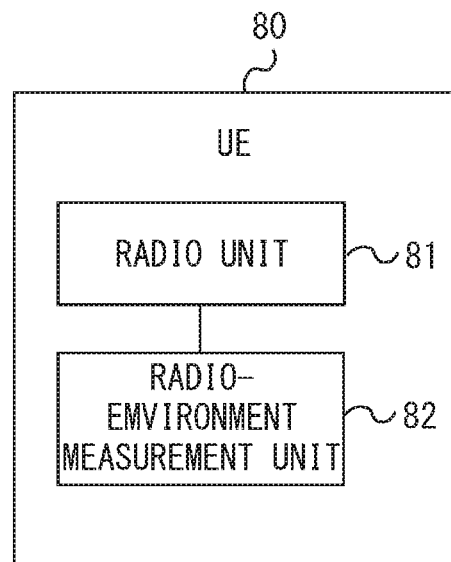
FIG. 5 is a configuration diagram of a UE according to the second embodiment.

Next, a configuration example of the UE 80 according to the second embodiment is described with reference to FIG. 5. The UE 80 includes a radio unit 81 and a radio-environment measurement unit 82. The radio unit 81 and the radio-environment measurement unit 82 may each be software or a module the processing of which is performed by a processor executing programs stored in a memory. Alternatively, the radio unit 81 and the radio-environment measurement unit 82 may each be hardware such as a chip or a circuit.

The radio-environment measurement unit 82 measures the communication quality of the radio resource for transmitting the DL data using the DL data transmitted from the eNB 60. The radio-environment measurement unit 82 transmits, to the eNB 60, the communication quality of the radio resource for transmitting the DL data via the radio unit 81.

Figure 6:
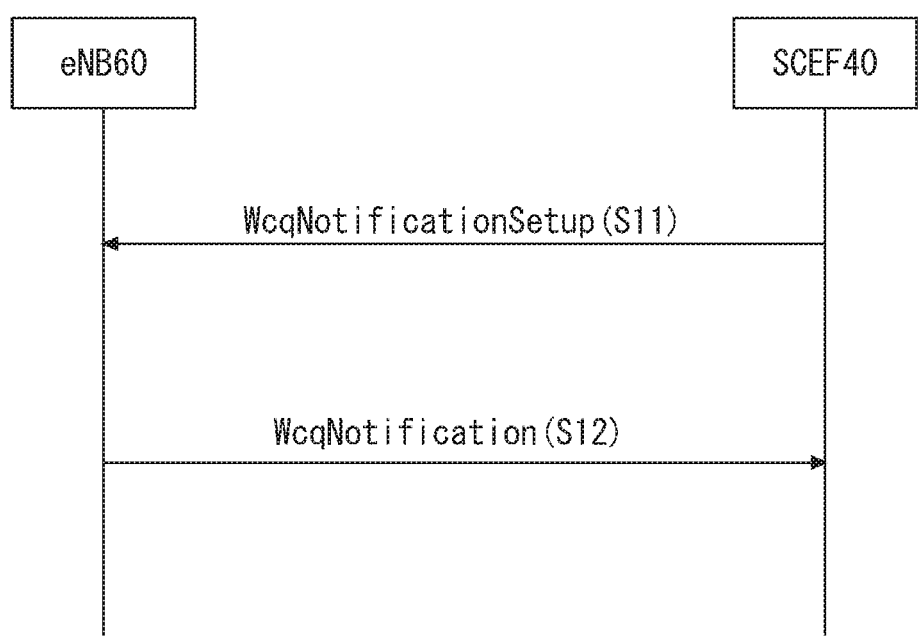
FIG. 6 is a diagram showing processing of the MEC server for acquiring a communication quality of a radio resource from the eNB according to the second embodiment.

Next, processing of the MEC server 40 for acquiring the communication quality of the radio resource from the eNB 60 is described with reference to FIG. 6. First, the MEC server 40 transmits a request message to the eNB 60 in order to acquire the communication quality of the radio resource (S11). Specifically, the MEC server 40 transmits a WcqNotificationSetup message to the eNB 60. A Wireless Channel Quality (WCQ) indicates the communication quality of the radio resource. The WCQ may be, for example, information such as a CQI, a signal level, or a noise level. The information about a signal level and a noise level may be, for example, information indicating the signal strength, the noise strength, and the like. In addition, the WCQ may be a Signal to Interference plus Noise power Ratio (SINR) expressed by a signal level and a noise level. Parameters shown in FIG. 7 are set in the WcqNotificationSetup message.

For example, the eNB ID indicating the eNB 60 as the transmission destination and the MEC server ID indicating the MEC server 40 as the transmission source are set in the WcqNotificationSetup message. Furthermore, Direction indicating whether the WCQ which the MEC server 40 desires to acquire is the WCQ regarding the radio resource for UL, the WCQ regarding the radio resource for DL, or the WCQ regarding the radio resource for UL and DL is set. In addition, NotificationInterval indicating a transmission interval may be set in the WcqNotificationSetup message.

Returning to FIG. 6, the eNB 60, then, transmits a WcqNotification message to the MEC server 40 as a response message to the WcqNotificationSetup message (S12). Parameters shown in FIG. 8 are set in the WcqNotification message.

For example, the MEC server ID indicating the MEC server 40 as the transmission destination and the eNB ID indicating the eNB 60 as the transmission source are set in the WcqNotification message. Furthermore, Direction indicating whether the WCQ set in the WcqNotification message is the WCQ regarding the radio resource for UL, the WCQ regarding the radio resource for DL, or the WCQ regarding the radio resource for UL and DL is set.

In addition, a WcqValue indicating the value of the WCQ of each UE regarding its resource block is set in the WcqNotification message. Here, as an specific example of the radio resource, resource blocks are used. The resource block is identified using time information and frequency information. The WcqValue of each resource block is transmitted from the eNB 60 to the MEC server 40. The WcqValue may be, for example, expressed by an integer, such as level 1 or level 2. In this case, as the value becomes greater, the quality of the corresponding resource block is better. In addition, level X or more (X is an integer) may be set as a High level, level Y or more (Y is an integer smaller than X) and less than level X may be set as a Middle level, and level Y or less may be set as a Low level.

Figures 9, 10:
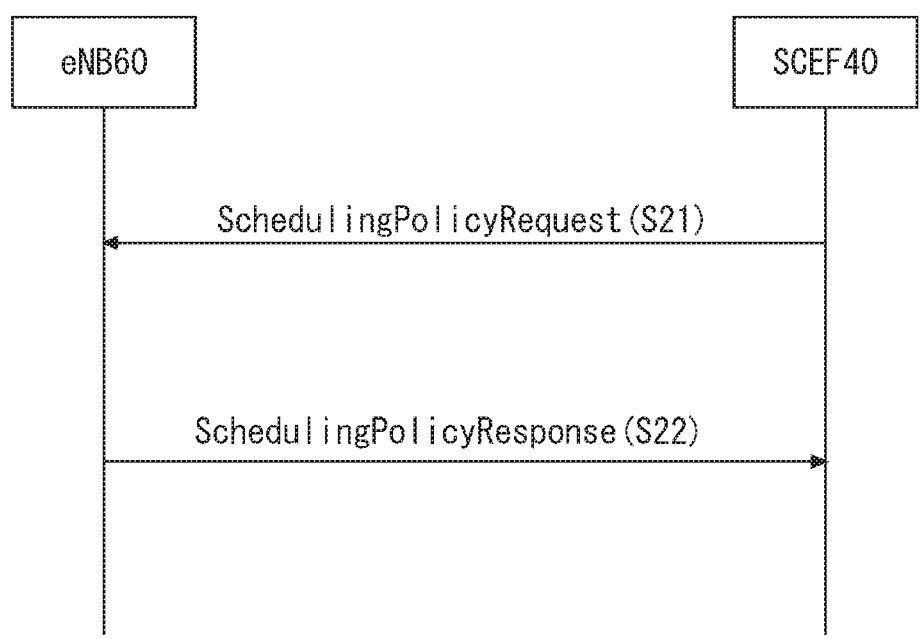
FIG. 9 is a diagram showing WcqValues set in the WcqNotification message according to the second embodiment.
FIG. 10 is a diagram showing processing of the MEC server for acquiring a scheduler type from the eNB according to the second embodiment.

Here, the WcqValue set in the WcqNotification message is described with reference to FIG. 9. The resource blocks are identified using RBindex. FIG. 9 shows that the WcqValue of each UE is set in each of the resource blocks of RBindex 1 to 100. The WcqValue is set in a blank in FIG. 9. The UEs are identified using UEIDs. FIG. 9 shows that the UEs are identified by 000001 to FFFFFF. The UEIDs may be, for example, MAC UEIDs.

Next, processing of the MEC server 40 for acquiring a scheduler type from the eNB 60 is described with reference to FIG. 10. First, the MEC server 40 transmits a request message to the eNB 60 in order to acquire a scheduler type (S21). Specifically, the MEC server 40 transmits a SchedulingPolicyRequest message to the eNB 60. Parameters shown in FIG. 11 are set in the SchedulingPolicyRequest message.

For example, the eNB ID indicating the eNB 60 as the transmission destination and the MEC server ID indicating an SCEF 40 as the transmission source are set in the SchedulingPolicyRequest message. In addition, NotificationInterval indicating a transmission interval may be set in the SchedulingPolicyRequest message.

Returning to FIG. 10, the eNB 60, then, transmits a SchedulingPolicyResponse message to the MEC server 40 as a response message to the SchedulingPolicyRequest message (S22). Parameters shown in FIG. 12 are set in the SchedulingPolicyResponse message.

For example, the MEC server ID indicating the MEC server 40 as the transmission destination and the eNB ID indicating the eNB 60 as the transmission source are set in the SchedulingPolicyResponse message. In addition, the scheduler type used in the eNB 60 is set. As the scheduler type, for example, PF, RR, or MT may be set.

Figure 13:
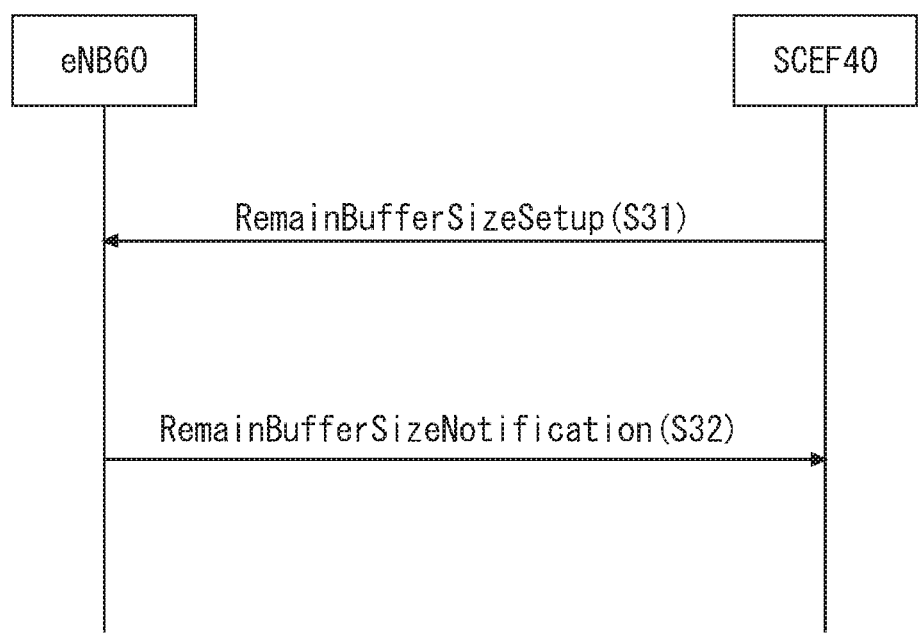
FIG. 13 is a diagram showing processing of the MEC server for acquiring a buffer size from the eNB according to the second embodiment.

Next, processing of the MEC server 40 for acquiring a buffer size from the eNB 60 is described with reference to FIG. 13. The buffer size includes at least either one of, for example, the buffer size used by the eNB 60 to transmit the DL data to the UE 80 or the buffer size used by the UE 80 to transmit the UL data to the eNB 60. The buffer size may be referred to as the size of untransmitted data in the eNB 60 or the UE 80.

First, the MEC server 40 transmits a request message to the eNB 60 in order to acquire the buffer size (S31). Specifically, the MEC server 40 transmits a RemainBufferSizeSetup message to the eNB 60. Parameters shown in FIG. 14 are set in the RemainBufferSizeSetup message.

For example, the eNB ID indicating the eNB 60 as the transmission destination and the MEC server ID indicating the MEC server 40 as the transmission source are set in the RemainBufferSizeSetup message. In addition, NotificationInterval indicating a transmission interval may be set in the RemainBufferSizeSetup message.

Returning to FIG. 13, the eNB 60, then, transmits a RemainBufferSizeNotification message to the MEC server 40 as a response message to the RemainBufferSizeSetup message (S32). Parameters shown in FIG. 15 are set in the RemainBufferSizeNotification message.

For example, the MEC server ID indicating the MEC server 40 as the transmission destination and the eNB ID indicating the eNB 60 as the transmission source are set in the RemainBufferSizeNotification message. The buffer size of each UE 80 is further set as Remain BufferSize. The eNB 60 acquires information about the buffer size from a memory provided with a buffer or the like to set the buffer size regarding the DL data. On the other hand, the eNB 60 acquires information about the buffer size from the UE 80 to set the buffer size regarding the UL data. For example, when receiving the RemainBufferSizeSetup message, the eNB 60 may start acquiring, from the UE 80, the information about the buffer size regarding the UL data. Note that, in the case of using an SCEF as the communication device 10, the above MEC server ID may be an SCEF ID.

Here, RemainBufferSize set in the RemainBufferSizeNotification message is described with reference to FIG. 16. FIG. 16 shows the buffer size of each UE. For example, the UE the UEID of which is 000001 has 5 bytes as the buffer regarding the UL data (ulBufferSize), and the eNB 60 has 30 bytes as the buffer regarding the DL data (dlBufferSize) to be downloaded by the UE the UEID of which is 000001.

Returning to FIG. 15, in the RemainBufferSizeNotification message, Direction indicating whether the buffer size set in the RemainBufferSizeNotification message is the buffer size regarding the UL data, the buffer size regarding the DL data, or the buffer size regarding the UL and DL data.

Next, processing for determining whether to allow an additional flow according to the second embodiment is described with reference to FIG. 17. The processing for determining whether to allow an additional flow may be performed when, for example, a radio-resource allocation request message or the like is transmitted to the eNB 60 in order to transmit the data included in the flow regarding the new UE 80. That is, when being notified by the eNB 60 that the radio-resource allocation request message for the flow regarding the new UE 80 has been transmitted to the eNB 60, the MEC server 40 may determine whether to admit the flow regarding the new UE 80. Alternatively, when at least one piece of data included in the flow regarding the UE 80 is transmitted from the eNB 60, the MEC server 40 may determine whether to admit the flow regarding the UE 80 including the received at least one piece of data. In this case, the MEC server 40 may determine whether to admit a flow to be desired by a UE in the future.

Alternatively, the processing for determining whether to allow an additional flow may be performed when the eNB 60 completes the transmission of all the data included in the flow regarding a UE. That is, when being notified by the eNB 60 that the transmission of all the data included in the flow regarding the UE 80 has been completed, the MEC server 40 may determine whether to admit a flow to be desired by a UE in the future. For example, when the buffer size regarding the UE 80 transmitted from the eNB 60 is zero, the SCEF 40 may determine that the transmission of all the data included in the flow regarding the UE 80 has been completed. Alternatively, when receiving all the data included in the flow regarding the UE 80 from the eNB 60, the MEC server 40 may determine whether to admit a flow to be desired by a UE in the future. Note that, the UE 80 may transmit the data included in the flow regarding the UE 80 directly to the MEC server 40.

First, the scheduling control unit 41 calculates the data rate of the flow processed or transmitted by the eNB 60 (S41). It is assumed that the scheduling control unit 41 manages all the flows processed by the eNB 60 and has a management list in which, for example, each flow is assigned with an ID. For example, the scheduling control unit 41 calculates the data rate of the UL data in accordance with Expression 1.

$$\text{UL data rate}(T2-T1) = \{ulBuf(T1) + (flowSize - ulBuf(T2))\}/(T2-T1) \quad \text{Expression 1}$$

UL data rate (T2−T1): the transmission data rate of the UL data in a period from time T1 to time T2 (for example, T2 is the present time, and T1 precedes T2)

ulBuf (T1): the buffer size of the UL data at time T1 (Byte)

ulBuf (T2): the buffer size of the UL data at time T2 (Byte)

flowSize: the data size to be transmitted by the transmission deadline (Byte)

The data rate of the UL data is calculated with Expression 1. The data rate of the DL data can be calculated similarly.

Next, the scheduling control unit 41 estimates a future CQI value based on the acquired CQI value and estimates the data rate based on the estimated CQI value (S42). Here, the CQI is used as the WCQ. The future CQI value may be a CQI value at a time obtained by setting, for example, the present time to t and adding a predetermined time to the present time, such as t+1 millisecond. The predetermined time to be added to the present time is not limited to 1 millisecond. The predetermined time to be added to the present time may be, for example, 1 TTI which is a scheduling period in the eNB 60.

For example, the scheduling control unit 41 estimates a future CQI value based on the tendency of the CQI values acquired in the past. For example, the scheduling control unit 41 may estimate that the CQI value of the future radio resource increases when the CQI values of the radio resource acquired in the past tends to increase. On the other hand, the scheduling control unit 41 may estimate that the CQI value of the future radio resource decreases when the CQI values of the radio resource acquired in the past tends to decrease.

When estimating that, for example, the CQI value at t+1 millisecond improves, the scheduling control unit 41 may estimate that the data rate at t+1 millisecond is greater than the data rate calculated in step S41. The degree of the increase in the data rate based on the increase in the CQI value may be predetermined. In addition, the degree of the decrease in the data rate based on the decrease in the CQI value may be predetermined.

Next, the scheduling control unit 41 calculates a Remain Flow Size (RFS) of each flow processed by the eNB 60 (S43). The RFS is the amount of data that remains in the buffer after a predetermined time passes when the data stored in the buffer at time T2 is transmitted at the data rate estimated in step S42. That is, the RFS is the amount of untransmitted data after a predetermined time passes when the data stored in the buffer at time T2 is transmitted at the data rate estimated in step S42. The predetermined time may be, for example, 1 millisecond when the CQI at t+1 millisecond is estimated. In addition, the time after the predetermined time is a timing before the transmission deadline is expired. The RFS may be calculated in accordance with, for example, Expression 2.

$$\text{RFS} = ulBuf(T2) - \alpha \times \text{UL data rate}(T2-T1) \times \text{predetermined time} \quad \text{Expression 2}$$

α: a constant defined by an estimated CQI value.

α×UL data rate (T2−T1): the data rate after the predetermined time (estimated value)

The scheduling control unit 41 calculates, in step S43, the respective RFSs regarding all flows to be processed by the eNB 60.

Next, the scheduling control unit 41 deletes a flow in which RFS=0 from a list of managing flows (S44). RFS=0 indicates that all the data included in a flow can be transmitted by the transmission deadline. Next, the scheduling control unit 41 determines whether all the flows are deleted from the list of managing flows (S45). The delete of all the flows from the list of managing flows means that all the data included in the flows being processed by the eNB 60 is transmitted by the transmission deadline. That is, all the flows are completed by the transmission deadline. Thus, when all the flows are deleted from the list of flows managed by the scheduling control unit 41, the admission determination unit 42 completes processing without admission control. That is, the admission determination unit 42 admits a flow in which allocation of the current radio resource is desired or a flow in which allocation of the next or subsequent radio resource is desired.

When determining that all the flows are not deleted from the list of managing flows, the scheduling control unit 41 determines whether there is a flow in which transmission of the RFS data cannot be completed by the transmission deadline (S46). For example, the scheduling control unit 41 calculates a Flow Complete Time (FCT), which means the time required to complete transmission of the RFS data, in accordance with Expression 3.

$$FCT=uLBuf(T2)/UL\ data\ rate(T2-T1) \qquad \text{Expression 3}$$

Expression 3 expresses the FCT when the data stored in the buffer is transmitted at the data rate at time T2. When the data rate after the predetermined time defined by the estimated CQI is used, "α×UL data rate (T2−T1)" may be used instead of "UL data rate (T2−T1)".

The scheduling control unit 41 further compares the FCT of each flow with the time from the present time to the transmission deadline and determines, when there is a flow in which the FCT is longer than the compared time, that there is a flow in which transmission of the RFS data cannot be completed by the transmission deadline (S46). On the other hand, the scheduling control unit 41 determines, when there is no flow in which the FCT is longer than the compared time, that there is no flow in which transmission of the RFS data cannot be completed by the transmission deadline (S46). When determining that there is no flow in which transmission of the RFS data cannot be completed by the transmission deadline, the scheduling control unit 41 repeats the processing in step S42 and subsequent steps. In the processing in step S42 and subsequent steps, the data rate of each flow is calculated based on the CQI value at, for example, t+2 millisecond.

When the scheduling control unit 41 determines that there is a flow in which transmission of the RFS data cannot be completed by the transmission deadline, the admission determination unit 42 rejects an additional flow regarding a new UE 80 (S47).

Figure 17:
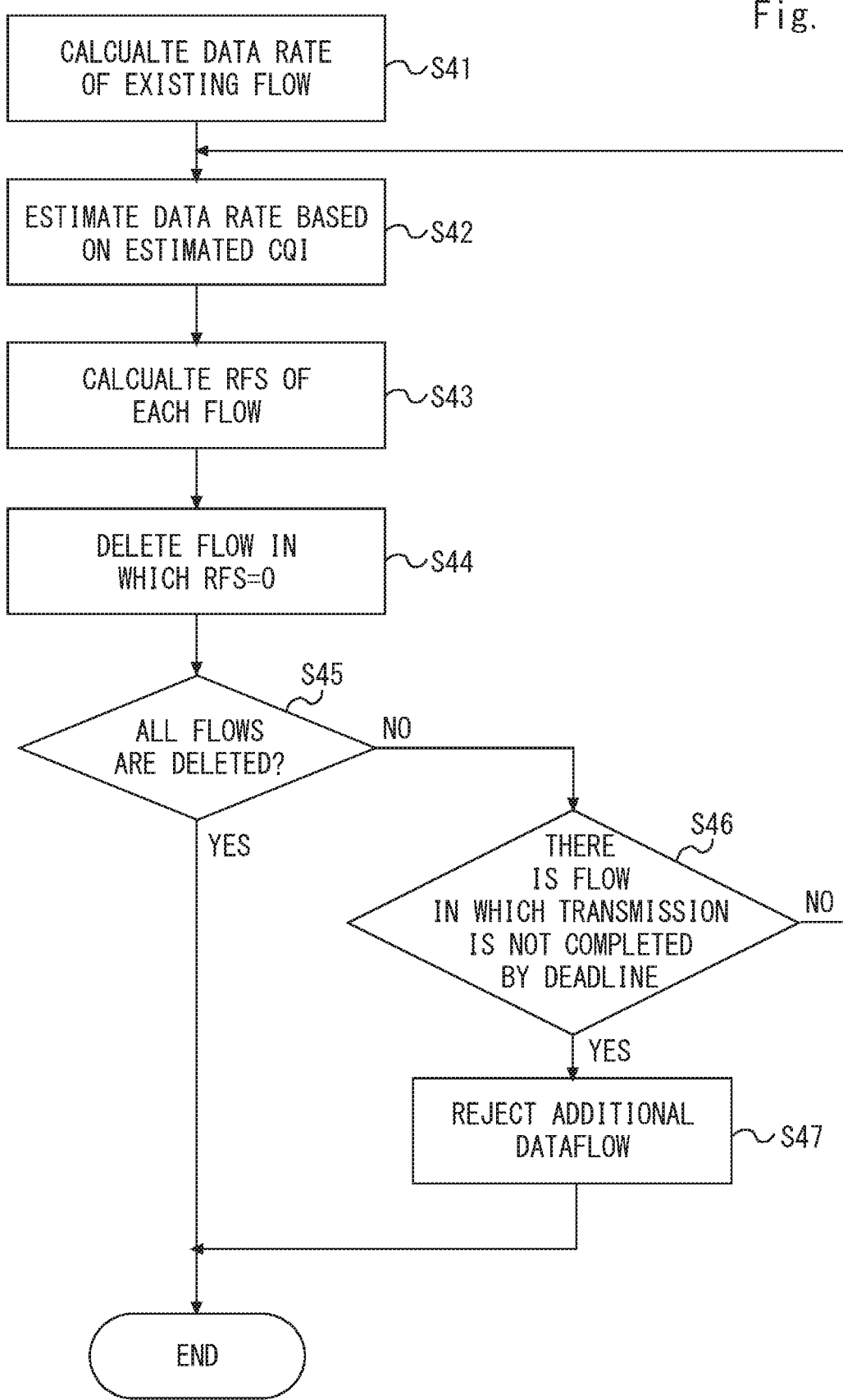
FIG. 17 is a flowchart showing processing for determining whether an additional flow is allowed according to the second embodiment.

The scheduling control unit 41 may perform the processing shown in FIG. 17 every Transmission Time Interval (TTI), which is the minimum allocation unit of the radio resource at the eNB 60, or every several TTIs. One TTI may be, for example, one millisecond.

As described above, by performing the processing for determining whether an additional flow is allowed according to the second embodiment, it is possible to reject an additional flow when the processing load on the eNB 60 is too high to transmit all the data by the transmission deadline. Thus, it is possible to suppress increase in processing load on the eNB 60.

In addition, the MEC server 40 according to the second embodiment can acquire, from the application server 70, information about the flow size, which is the data size to be transmitted in one flow, and about the transmission deadline. Thus, it is possible for the MEC server 40 to calculate the data rate of each flow and to determine whether all the data in each flow is transmitted by the transmission deadline.

On the other hand, if the eNB 60 determines whether all the data in each flow is transmitted by the transmission deadline, it is required to acquire information about the flow size of each flow from the UE 80. In this case, processing for setting the flow size in data to be transmitted from the UE 80 is required. This increases the processing load on the UE 80 and further requires the UE 80 to have an additional function.

Figure 18:
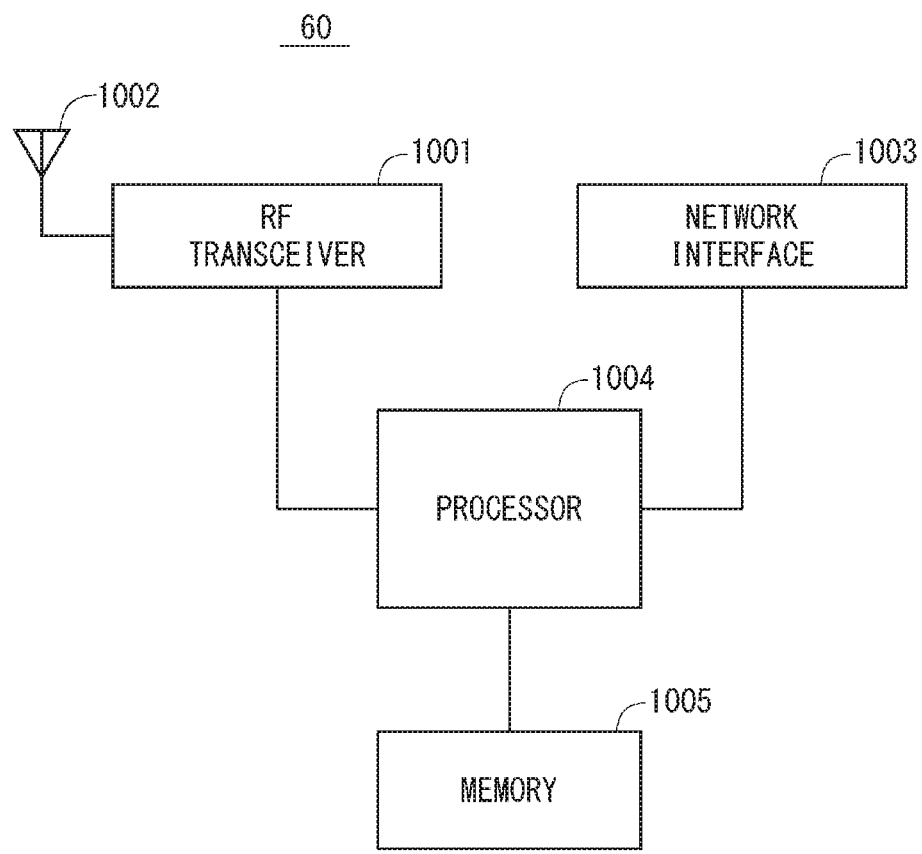
FIG. 18 is a configuration diagram of the eNB according to each embodiment.

In the following, configuration examples of the eNB 60, the MEC server 40, and the UE 80 described in the above embodiments are described. FIG. 18 is a block diagram showing a configuration example of the eNB 60. Referring to FIG. 18, the eNB 60 includes an RF transceiver 1001, a network interface 1003, a processor 1004, and a memory 1005. The RF transceiver 1001 performs analogue RF signal processing to communicate with UEs. The RF transceiver 1001 may include a plurality of transceivers. The RF transceiver 1001 is coupled to an antenna 1002 and the processor 1004. The RF transceiver 1001 receives modulated symbol data (or OFDM symbol data) from the processor 1004, generates a transmission RF signal, and supplies the transmission RF signal to the antenna 1002. The RF transceiver 1001 further generates a baseband reception signal based on a reception RF signal received by the antenna 1002 and supplies it to the processor 1004.

The network interface 1003 is used to communicate with network nodes (e.g., other core network nodes). The network interface 1003 may include, for example, a network interface card (NIC) conforming to the IEEE 802.3 series.

The processor 1004 performs data-plane processing (including digital baseband signal processing) and control-plane processing for radio communication. In the case of LTE or LTE-Advanced, for example, the digital baseband signal processing performed by the processor 1004 may include signal processing of a MAC layer and a PHY layer.

The processor 1004 may include a plurality of processors. The processor 1004 may include, for example, a modem processor (e.g., a DSP) that performs the digital baseband signal processing and a protocol-stack processor (e.g., a CPU or an MPU) that performs the control-plane processing.

The memory 1005 is constituted by a combination of a volatile memory and a nonvolatile memory. The memory 1005 may include a plurality of memory devices that are physically independent from each other. The volatile memory is, for example, a Static Random Access Memory (SRAM), a Dynamic RAM (DRAM), or a combination thereof. The nonvolatile memory is, for example, a mask Read Only Memory (MROM), an Electrically Erasable Programmable ROM (EEPROM), a flash memory, a hard disk drive, or any combination thereof. The memory 1005 may include a storage arranged apart from the processor 1004. In this case, the processor 1004 may access the memory 1005 via the network interface 1003 or an I/O interface (not shown).

The memory 1005 may store software modules (computer programs) including instructions and data to perform the processing of the eNB 60 described in the above embodiments. In some implementations, the processor 1004 may be configured to load these software modules from the memory 1005 and execute them in order to perform the processing of the eNB 60 described in the above embodiments.

Figure 19:
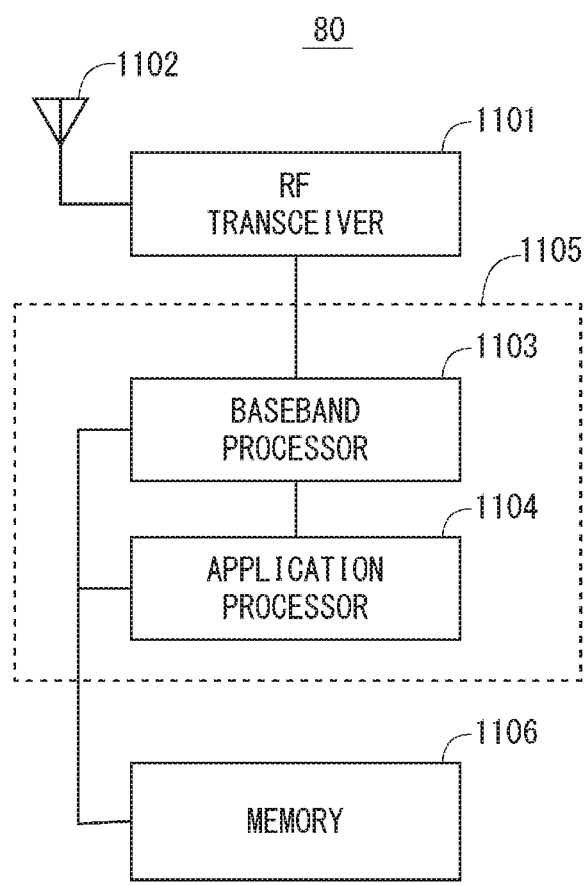
FIG. 19 is a configuration diagram of the UE according to each embodiment.

FIG. 19 is a block diagram showing a configuration example of the UE 80. A Radio Frequency (RF) transceiver 1101 performs analogue RF signal processing to communicate with the eNB 60. The analog RF signal processing performed by the RF transceiver 1101 includes frequency up-conversion, frequency down-conversion, and amplification. The RF transceiver 1101 is coupled to an antenna 1102 and a baseband processor 1103. Specifically, the RF transceiver 1101 receives modulated symbol data (or OFDM symbol data) from the baseband processor 1103, generates a transmission RF signal, and supplies the transmission RF signal to the antenna 1102. The RF transceiver 1101 further generates a baseband reception signal based on a reception RF signal received by the antenna 1102 and supplies it to the baseband processor 1103.

The baseband processor 1103 performs digital baseband signal processing (data-plane processing) and control-plane processing for radio communication. The digital baseband signal processing includes (a) data compression/decompression, (b) data segmentation/concatenation, (c) composition/decomposition of a transmission format (transmission frame), (d) channel coding/decoding, (e) modulation (symbol mapping)/demodulation, and (f) generation of OFDM symbol data (baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1103 may include signal processing of a Packet Data Convergence Protocol (PDCP) layer, a Radio Link Control (RLC) layer, a MAC layer, and a PHY layer. In addition, the control-plane processing performed by the baseband processor 1103 may include processing of a Non-Access Stratum (NAS) protocol, an RRC protocol, and a MAC CE.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1104 described below.

The application processor 1104 may also be referred to as a CPU, an MPU, a microprocessor, or a processor core. The application processor 1104 may include a plurality of processors (processor cores). The application processor 1104 executes a system software program (Operating System (OS)) and various application programs (e.g., a voice call application, a WEB browser, a mailer, a camera operation application, and a music playback application) loaded from a memory 1106 or from another memory (not shown) to perform various functions of the UE 80.

In some implementations, as shown by a dashed line (1105) in FIG. 19, the baseband processor 1103 and the application processor 1104 may be integrated on a single chip. In other words, the baseband processor 1103 and the application processor 1104 may be implemented as a single System on Chip (SoC) device 1105. An SoC device may be referred to as a system Large Scale Integration (LSI) or a chipset.

The memory 1106 is a volatile memory, a nonvolatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disk drive, or any combination thereof. The memory 1106 may include, for example, an external memory device that can be accessed by the baseband processor 1103, the application processor 1104, and the SoC 1105. The memory 1106 may include an internal memory device that is integrated in the baseband processor 1103, the application processor 1104, or the SoC 1105. In addition, the memory 1106 may include a memory in a Universal Integrated Circuit Card (UICC).

The memory 1106 may store software modules (computer programs) including instructions and data to perform the processing of the UE 80 described in the above embodiments. In some implementations, the baseband processor 1103 or the application processor 1104 may be configured to load these software modules from the memory 1106 and execute them in order to perform the processing of the UE 80 described in the above embodiments.

Figure 20:
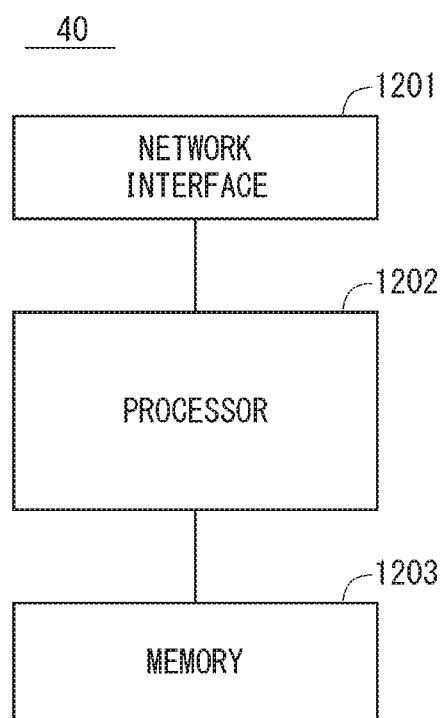
FIG. 20 is a configuration diagram of the MEC server according to each embodiment.

FIG. 20 is a block diagram showing a configuration example of the MEC server 40. Referring to FIG. 20, the MEC server 40 includes a network interface 1201, a processor 1202, and a memory 1203. The network interface 1201 is used to communicate with network nodes (e.g., a remote node 10 and a core network 40). The network interface 1201 may include, for example, a network interface card (NIC) conforming to the IEEE 802.3 series.

The processor 1202 loads software (computer programs) from the memory 1203 and executes them to perform the processing of the center node 20 described in the above embodiments with reference to the sequence diagrams and the flowchart. The processor 1202 may be, for example, a microprocessor, an MPU, or a CPU. The processor 1202 may include a plurality of processors.

The processor 1202 performs data-plane processing (including digital baseband signal processing) and control-plane processing for radio communication. In the case of LTE or LTE-Advanced, for example, the digital baseband signal processing performed by the processor 1004 may include signal processing of PDCP, RLC, and MAC layers. In addition, the processing performed by the processor 1202 may include signal processing of a GTP-U UDP/IP layer on X2-U and S1-U interfaces. The control-plane processing performed by the baseband processor 1004 may further include processing of an X2AP protocol, an S1-MME protocol, and an RRC protocol.

The processor 1202 may include a plurality of processors. The processor 1004 may include, for example, a modem processor (e.g., a DSP) that performs the digital baseband signal processing, a processor (e.g., a DSP) that performs the signal processing of the GTP-U UDP/IP layer on X2-U and S1-U interfaces, and a protocol-stack processor (e.g., a CPU or an MPU) that performs the control-plane processing.

The memory 1203 is constituted by a combination of a volatile memory and a non-volatile memory. The memory 1203 may include a storage arranged apart from the processor 1202. In this case, the processor 1202 may access the memory 1203 via an I/O interface (not shown).

In the example of FIG. 20, the memory 1203 is used to store software modules. The processor 1202 loads these software modules from the memory 1203 and executes them in order to perform the processing of the MEC server 40 described in the above embodiments.

As described with reference to FIGS. 18 to 20, each of the processors included in the eNB 60, the MEC server 40, and the UE 80 according to the above embodiments executes one or more programs including instructions for causing a computer to perform the algorithm described with reference to the drawings.

In the above examples, the programs can be stored in various non-transitory computer-readable medium and supplied to computers. The non-transitory computer-readable medium includes various tangible storage medium. Examples of the non-transitory computer-readable medium include magnetic recording media (for example, a flexible disk, a magnetic tape, and a hard disk drive), magneto-optic storage media (for example, a magneto-optic disk), a CD Read Only Memory (CD-ROM), a CD-R, a CD-R/W, and semiconductor memories (for example, a mask ROM, a Programmable ROM (PROM), an Erasable PROM (EPROM), a flash ROM, and a Random Access Memory (RAM)). The programs may be supplied to a computer by using various transitory computer-readable medium. Examples of the transitory computer-readable medium include electrical signals, optical signals, and electromagnetic waves. The transitory computer-readable medium can be used to supply programs to a computer via a wired communication line, such as an electric wire and an optical fibers, or a wireless communication line.

The present invention is not limited to the above embodiments and modifications can be made as appropriate without departing from the scope thereof. The present invention may be implemented by combining the embodiments as appropriate.

REFERENCE SIGNS LIST

10 Communication device
11 Determination unit
12 Communication unit
20 Base station
30 Radio terminal
40 MEC server
41 Scheduling control unit
42 Admission determination unit
43 eNB communication unit
50 Gateway
60 eNB
61 Core-network node communication unit
62 Radio-environment acquisition unit
63 Admission control unit
64 Radio unit
70 Application server
80 UE
81 Radio unit
82 Radio-environment measurement unit
100 Core network

The invention claimed is:

1. A method for a communication device comprising:
   determining whether to admit a flow regarding a new radio terminal, wherein the flow is to be transmitted between the new radio terminal and a base station and having a transmission deadline, depending on a transmission state of a plurality of data packets included in the flow;
   determining whether to admit the flow regarding the new radio terminal using information indicating whether all the plurality of data packets are transmitted by the transmission deadline;
   determining, using a data rate when the plurality of data packets is transmitted and a size of untransmitted data packets, whether all the untransmitted data packets are transmitted by the transmission deadline; and
   transmitting, to the base station, instruction information indicating whether to admit the flow regarding the new radio terminal.

2. The method according to claim 1 further comprising:
   executing instructions to calculate a data rate of a flow using a buffer size used by the new radio terminal or the base station to transmit a plurality of data packets included in the flow and a data size of the plurality of data packets included in the flow.

3. The method according to claim 1 further comprising:
   executing instructions to estimate a quality of a radio resource for transmitting the plurality of data packets and to determine the data rate using the estimated quality of the radio resource.

4. The method according to claim 1 further comprising:
   executing instructions to stop admitting the flow regarding the new radio terminal if a number of radio terminals, all data packets of which are not transmitted by the transmission deadline, exceeds a predetermined number.

5. The method according to claim 1 further comprising:
   executing instructions to emulate data-packet scheduling control performed by the base station and to determine whether all the plurality of data packets are transmitted by the transmission deadline.

* * * * *